Dec. 29, 1931.  A. M. BUSWELL ET AL  1,838,474
SEWAGE TREATMENT
Filed May 9, 1929
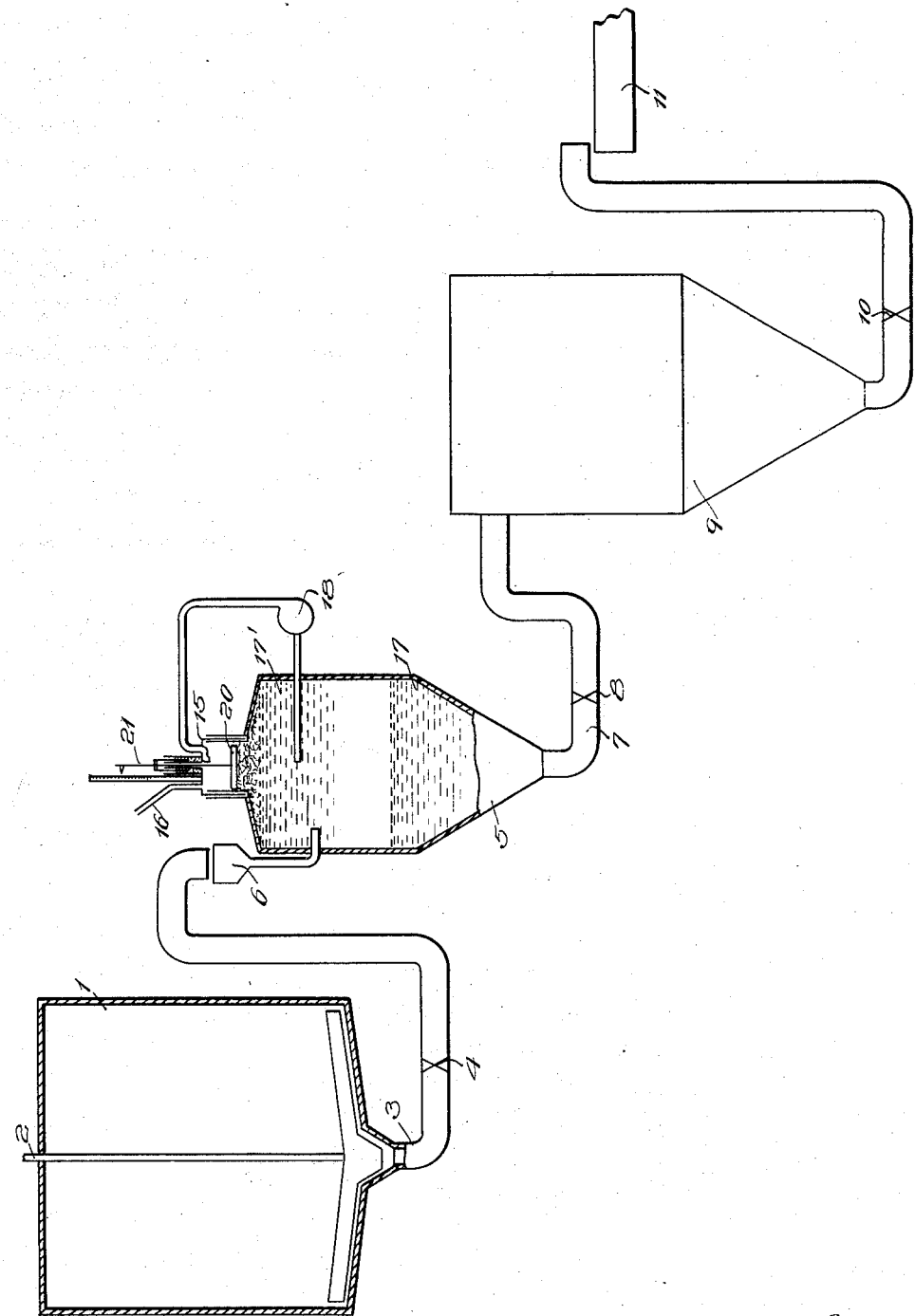
Witness:
William G. Kilroy
Inventors
Arthur M. Buswell
Sidney L. Neave
By Brown, Jackson, Boettcher & Dienner
Attys.

Patented Dec. 29, 1931

1,838,474

UNITED STATES PATENT OFFICE

ARTHUR M. BUSWELL AND SIDNEY L. NEAVE, OF URBANA, ILLINOIS, ASSIGNORS TO BOARD OF TRUSTEES OF THE UNIVERSITY OF ILLINOIS, OF URBANA, ILLINOIS, A CORPORATION OF ILLINOIS

SEWAGE TREATMENT

Application filed May 9, 1929. Serial No. 361,570.

This invention relates to sewage sludge digestion.

The usual method of digesting sludge is to allow it to remain in a tank for three or four months during which time the material is decomposed by bacteriological and chemical action. The process is generally a continuous one, new material being periodically added to the tank and some of the digested material being periodically withdrawn.

During the first few days of decomposition an appreciable amount of gas having a high calorific value is generated. This gas may be collected and sold.

The gases collected may have a calorific value of about 50% better than that of domestic gas, and there is from 1 to 4 cubic feet of gas liberated per day, per capita. During the early stages of decomposition of sewage sludge a difficulty is generally encountered due to the accumulation of scum. When the digestion is carried out of a continuous process, new sludge being constantly added, we have found that the scum reached a thickness of twenty-six inches in about a month. It had a moisture content of 80% and was so stiff that a shovel was forced into it with difficulty. Liquor expressed from the scum had a pH of 5. This scum slows down the decomposition process and is objectionable in many other respects. It sometimes happens that a froth or foam forms rather than a scum. As pointed out in the pending application of Arthur M. Buswell, this scum or foam may be broken up by circulating some of the liquor from the digestion chamber onto the scum or foam.

It has long been known that the digestion of sewage solids occurs in two stages, a so-called acid or foul stage, followed by the alkaline or methane stage. In well operating tanks the two stages of digestion go on together and at such a rate that the alkalies apparently produced in the second stage of digestion neutralize the acids in the first. In some cases, however, the acid stage predominates and it is difficult to obtain satisfactory digestion without special procedure.

For regulating such conditions the addition of lime has been employed. The cost of lime necessary is frequently so great as to prohibit its use. It has also been recommended that a certain minimum amount of old sludge be maintained in the digestion tank to keep the acid digestion from predominating.

We have found that the acid stage of digestion, which is the first stage, results largely in the digestion of so-called greases which include animal and vegetable fats, and the soaps. It is during this stage of digestion that most of the valuable gases are liberated and also during this stage that the scum or foam is formed. As a result of a study of the possible chemical reactions that must occure during the decomposition of fats and greases we have found that if the acid and alkaline stages of digestion are separated, that is, carried on in different tanks, certain advantages are had. We have found that there is at first a relatively rapid fermentation which results in the decomposition of the simpler compounds and the production of a large quantity of gas. This fermentation is apparently completed in a few days. It has been observed that 50% of the gas is evolved in the first twenty-four hours and that 90% of the gas is evolved in the first four to eight days. After this stage of fermentation has reached completion it is still necessary to allow the sludge to undergo some sort of ripening process. The exact nature of this digestion is not understood, but the net result is that the sludge loses its water-binding property and can be drained on sand beds.

This second stage of digestion lasts for several months. It is one of the objects of the present invention to carry out the process of digestion in two stages, and in two separate tanks, the first tank being relatively small and designed to allow four to eight days detention, and the second tank being of sufficient size to allow for the necessary ripening of the sludge to a state where it will drain on sand beds.

The process when carried out in this manner has the following advantages:

1. It is less costly to construct since only the small primary tank requires a cover for gas collection;

2. Devices for preventing the formation of scum and foam need be provided for the primary tank only, since no scum is observed in the secondary stage of digestion;

3. Sludge may be drawn from the secondary tank to the sludge drying beds without any chance of contamination with fresh or undigested sludge.

This third advantage, above mentioned, has been recognized heretofore in other connections. The attainment of the above and further objects of the present invention will be apparent from the following specification taken in conjunction with the drawing forming a part thereof.

The drawing illustrates, in diagrammatic form, a sewage digestion plant operating in accordance with our invention.

In the drawing, 1 represents the usual sedimentation tank in which the sewage sludge is permitted to settle before it is sent to the digestion tank or tanks. The sedimentation tank is provided with a mechanical scraper indicated at 2 and has an outlet 3 through which the sewage sludge passes by way of a valve 4 to a digestion tank. A primary digestion tank indicated at 5 receives the sludge from the sedimentation tank 1. The primary sludge digestion tank is of a construction such as shown in the copending application of Arthur M. Buswell filed of even date herewith. The sludge is admitted into the tank 5 through an inlet 6 and leaves the tank through an outlet 7 controlled by a valve 8. A secondary sludge digestion tank 9, of appreciably larger size than the tank 5 is provided for carrying on the secondary stage of digestion. In the present instance, the tank 9 has approximately three times the volume of the primary tank 5, although we do not wish to be limited to the precise ratio shown. A sludge bed 11 is provided for receiving the sludge from the secondary sludge digestion tank 9, a valve 10 being interposed to control the flow of sludge.

The sludge entering the primary digestion tank from the sedimentation tank 1 contains about 5% solids and 95% water. Sludge is introduced into the primary tank where it is permitted to remain until the primary or acid stage of decomposition is completed. During this stage of decomposition about 50% of the solid matter is given off in the form of a gas which is collected. For this purpose the tank 5 is provided with a cover 15 for gas collection, the collected gas passing through the outlet 16 to a suitable gas holder. The solid matter settles to the bottom as indicated at 17. The sediment at the bottom of the tank 5 is about 95% water. New sludge is periodically introduced into the tank 5 and the liquid indicated at 17' at the top of the tank 5 is permitted to drain off. The rate at which sludge is introduced into the primary sludge digestion tank and the rate at which it is withdrawn from the bottom of the tank is such as to allow the particles of solid matter to remain in the tank from four to eight days which is the time taken for the liberation of the major portion of the valuable gases. To prevent the accumulation of scum or foam at the top of the tank, we provide a pump 18 for circulating the liquor from a level below that to which the scum or foam may extend, and deposit it on top of the scum or foam. This arrangement is more fully described in the application of Arthur M. Buswell above referred to, to which reference may be had for a more complete description.

To distribute the liquid discharged from the pump, we provide a distributor 20 in the form of a float made up of two pieces of wood secured together in the form of a cross. This float has a member 21 secured thereto and extending outside of the gas cover 15, which member 21 acts as an indicator to indicate the level of the liquid in the tank.

The material known as grease, that is, the material soluble in petroleum ether, undergoes digestion or fermentation first and it is by this fermentation that the valuable gases are produced. The major portion of the valuable gases is produced in a relatively short period of time, namely, from four to eight days and after this period there is no longer any tendency to form scum or foam. When the material at the bottom of the tank 5 has undergone digestion for four to eight days, it is transferred to the secondary digestion tank 9. Here the sludge undergoes further fermentation or digestion, the sludge remaining in this tank until it has ripened to a state where it will drain on a sand bed. This secondary stage of digestion is a relatively inoffensive one and the tank 9 does not, therefore, have to be provided with a cover. The digestion in the secondary tank is carried on as a continuous process, small amounts of the digested sludge being periodically withdrawn and partially digested sludge from the primary tank being periodically added.

The rate of transfer of sludge into and out of the tank 9 is such as to permit the individual particles of sludge to undergo complete digestion, which may take a period of a few months. The sludge settles in the tank 9 leaving a relatively clear and inoffensive liquid at the top, which liquid is permitted to flow out of the tank periodically.

In compliance with the requirements of the patent statutes, we have herein shown and described a preferred embodiment of our invention. It is understood that the present showing is merely illustrative of the invention and we do not wish to be limited to the precise details shown. What we consider new and desire to secure by Letters Patent is:

1. The method of carrying on sludge digestion which comprises, passing the sludge through a primary digestion tank at such a rate that the particles of sludge remain in the tank until the gas producing stage of decomposition has been substantially completed and then passing the partially digested sludge into a secondary digestion tank for further digestion, the liquid at the top of the primary tank being slowly circulated to prevent the accumulation of scum or foam.

2. The method of carrying on sludge digestion which comprises, passing the sludge through a primary digestion tank at such a rate that the particles of sludge remain in the tank until the gas producing stage of decomposition has been substantially completed and then passing the partially digested sludge into a secondary digestion tank for further digestion, the liquid at the top of the primary tank being slowly circulated to prevent the accumulation of scum or foam, and the gases liberated in the primary tank being collected.

3. The method of digesting organic matter which undergoes digestion in two stages, which comprises, passing the material into a primary digestion chamber, circulating the liquid in the chamber from beneath the top surface thereof to prevent the accumulation of foam or scum, and, upon the completion of the primary digestion, transferring the partially digested material into another chamber for secondary digestion.

In witness whereof, we hereunto subscribe our names this 3rd day of May, 1929.

ARTHUR M. BUSWELL.
SIDNEY L. NEAVE.